US008773523B2

(12) United States Patent
Chiu

(10) Patent No.: US 8,773,523 B2
(45) Date of Patent: Jul. 8, 2014

(54) GESTURE-BASED REMOTE CONTROL

(75) Inventor: Kuan-Jung Chiu, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 924 days.

(21) Appl. No.: 12/912,764

(22) Filed: Oct. 27, 2010

(65) Prior Publication Data

US 2011/0249107 A1 Oct. 13, 2011

(30) Foreign Application Priority Data

Apr. 13, 2010 (CN) .......................... 2010 1 0145825

(51) Int. Cl.
*H04N 7/18* (2006.01)

(52) U.S. Cl.
USPC ........................................................... 348/77

(58) Field of Classification Search
CPC ..... H04N 7/18; A61B 1/0005; B64D 11/0015
USPC ...................................................... 348/61, 77
See application file for complete search history.

(56) References Cited

FOREIGN PATENT DOCUMENTS

CN 201294582 Y 8/2009
JP 8-315154 A 11/1996
TW M358364 6/2009
TW 201014730 4/2010
WO WO2007138393 12/2007

OTHER PUBLICATIONS

[Name of Author Not Known], Gestures Remote Control Appliances, published in a serial named Technology and Market in China on Dec. 31, 2009, published online by China Academic Journal Electronic Publishing House c 1994-2010, p. 65, http://www.cnki.net. See Abstract.

*Primary Examiner* — Allen Wong
(74) *Attorney, Agent, or Firm* — Novak Druce Connolly Bove + Quigg LLP

(57) ABSTRACT

A remote control based on user's gesture includes an infrared emission unit, a storage unit, a gesture sensing unit, a processing unit and a code chip. The gesture sensing unit is configured to capture images and identify hand gestures in the images and output the gesture signals corresponding to the hand gestures to the processing unit; The storage unit stores a first relationship table of gesture signals and associated function instructions. The storage unit also stores a second relationship table of the function instructions and associated infrared remote control codes. The processing unit parses the gesture signal into the corresponding function instruction according to the first relationship table, and then outputs the function instruction to the encode chip, the encode chip chooses an infrared remote control code according to the function instruction and the second relationship table and drives the infrared emission unit to emit infrared rays carrying the infrared remote control code to the device.

8 Claims, 2 Drawing Sheets

GESTURE-BASED REMOTE CONTROL

BACKGROUND

1. Technical Field

The present disclosure relates to remote controls and, particularly, to a gesture-based remote control.

2. Description of Related Art

A remote control generally has a number of keys for activating a number of relevant functions of devices. Such a remote control function greatly contributes to user convenience. However, sometimes users just want to activate some general functions of the device but still need to find out the remote control, sometimes users involved in housework want to operate the device but worry about dirtying the remote control.

BRIEF DESCRIPTION OF THE DRAWINGS

The components of the drawings are not necessarily drawn to scale, the emphasis instead being placed upon clearly illustrating the principles of an gesture-based remote control. Moreover, in the drawings, like reference numerals designate corresponding parts throughout several views.

DETAILED DESCRIPTION

Figure 1:
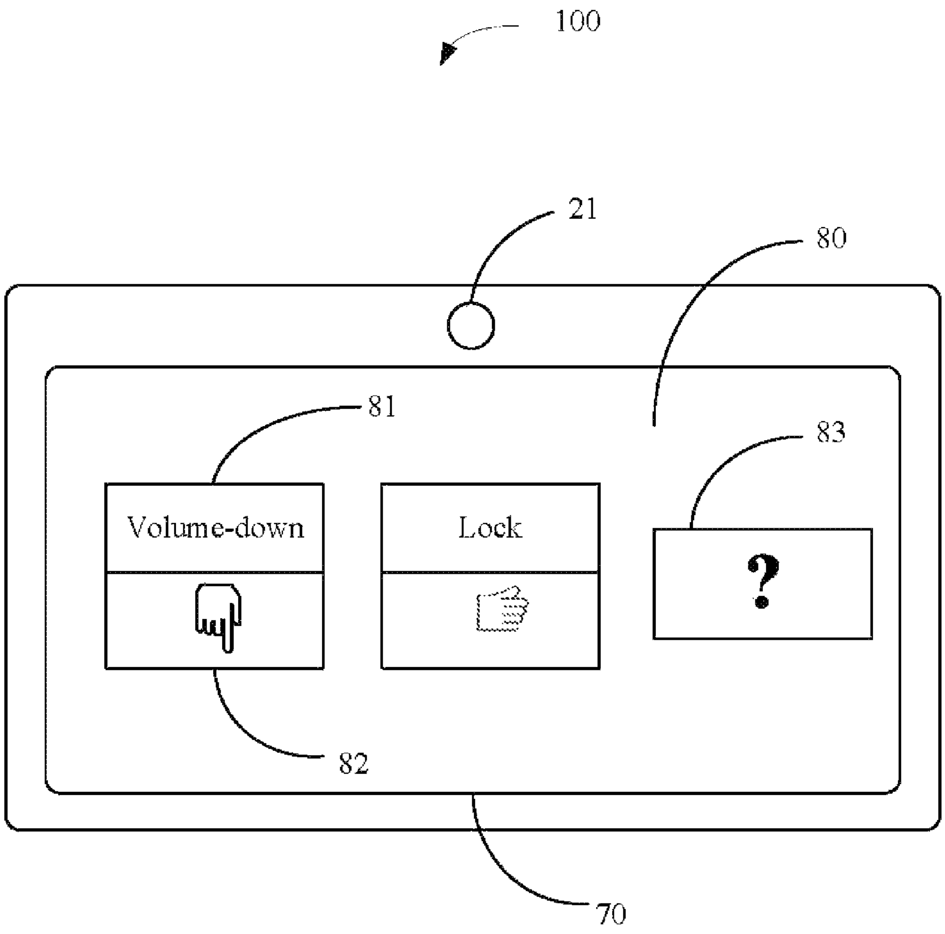
FIG. 1 is a schematic diagram of a gesture-based remote control in accordance with an exemplary embodiment.
Figure 2:
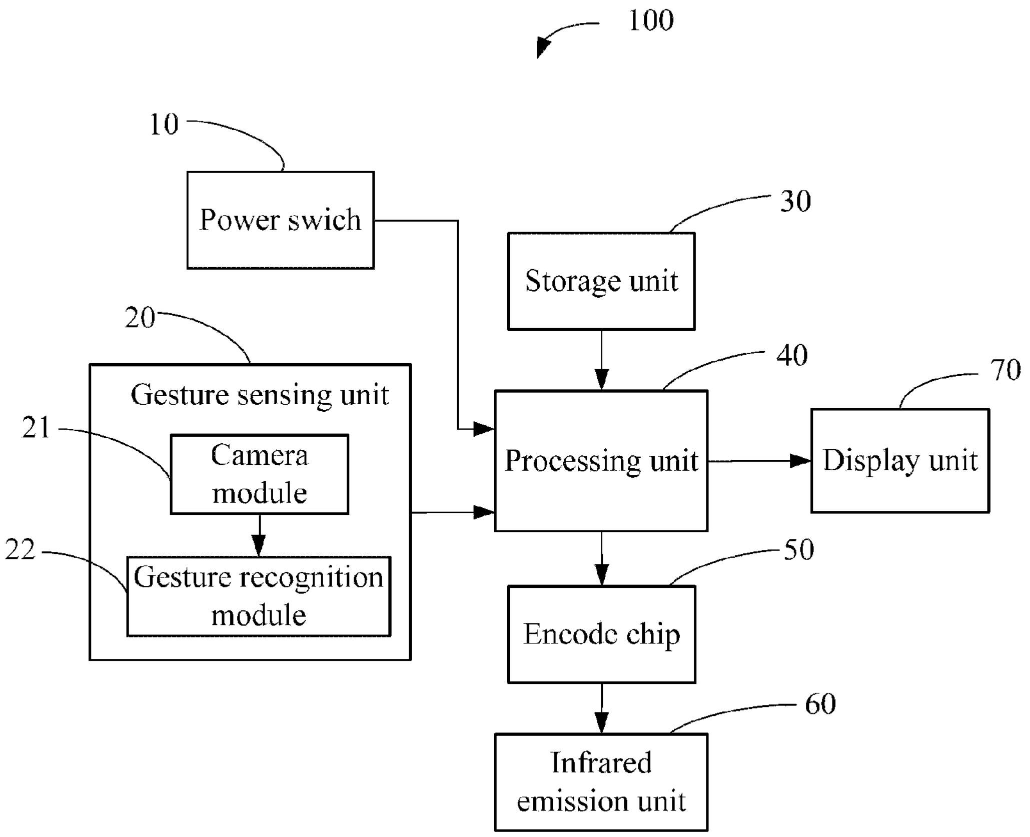
FIG. 2 is a block diagram of the gesture-based remote control in FIG. 1.

Referring to FIGS. 1-2, a gesture-based remote control 100 is used to remotely control functions of a device that it has been paired with. The device can be a television, air conditioner, computer etc. To facilitate the description, in this embodiment, the device is a television.

The gesture-based remote control 100 includes a power switch 10, a gesture sensing unit 20, a storage unit 30, a processing unit 40, an encoding chip 50, an infrared emission unit 60, and a display unit 70.

The power switch 10 is connected to the processing unit 40 and used for outputting a switching signal to the processing unit 40 to activate or deactivate the gesture-based remote control 100.

The gesture sensing unit 20 is configured to sense and identify hand gestures and output the gesture signals corresponding to the hand gestures to the processing unit 40. In this embodiment, the gesture sensing unit 20 includes a camera module 21 and a gesture recognition module 22. The camera module 21 is configured to continually capture images while activated. The remote control 100 would typically be placed or mounted having a line of sight view of both the television and viewing area where a user would be when viewing the television. The gesture recognition module 22 looks for and identifies any hand gestures in the captured images, and accordingly outputs gesture signals to the processing unit 40. For example, in this embodiment, if a user points down with one finger in view of the camera module 21, successive images captured of the user during the gesture by the camera module 21 are examined by the gesture recognition module 22. Upon recognizing the hand gesture the gesture recognition module 22 outputs a corresponding signal to the processing unit 40, in this case a signal that will cause the volume of the television to be turned down by a determined amount. It should be noted that any known object recognition algorithms may be used that can examine images for hand gestures.

The storage unit 30 stores a first relationship table of gesture signals and associated function instructions. For example, in this embodiment, the finger pointing down signal corresponds to a volume-down instruction. The storage unit 30 also stores a second relationship table of the function instructions and associated infrared remote control codes. Each function instruction corresponds to a function of the television.

The processing unit 40 parses the gesture signal into the corresponding function instruction according to the first relationship table, and then outputs the function instruction to the encoding chip 50. In this embodiment, the processing unit 40 parses the finger pointing down gesture into the volume-down instruction.

The encode chip 50 chooses an infrared remote control code according to the volume-down instruction and the second relationship table. Then the encode chip 50 drives the infrared emission unit 60 to emit infrared rays carrying the infrared remote control code to the television.

The processing unit 40 is also used to drive the display unit 70 to display a user guide 80. The user guide 80 may indicate with illustration hand gestures and associated function instructions. In this embodiment, an illustration hand gesture 82 and its associated function instruction 81 are presented, the function instruction 81 is "volume-down", and the corresponding illustration hand gesture 82 is an image of a finger pointing down. The illustration hand gesture 82 and the associated function instruction 81 may be highlighted or caused to blink, as well as the finger pointing down gesture parsed and associated function "volume-down" being activated.

The function instructions may also include a lock and unlock instructions used to deactivate the camera module 21 for preventing accidental gesture input. The user guide 71 may also include an error message illustration 83 for when there is a problem in processing such as when a user makes a gesture that cannot be matched up with a function instruction in the first table.

It is to be understood, however, that even though numerous characteristics and advantages of the present disclosure have been set forth in the foregoing description, together with details of the structure and function of the present disclosure, the present disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A gesture-based remote control for controlling a device, comprising:

a processing unit;

an infrared emission unit;

a gesture sensing unit configured to sense and identify hand gestures and output the gesture signals corresponding to the hand gestures to the processing unit;

a storage unit storing a first relationship table and a second relationship table, wherein the first relationship table records gesture signals and associated function instructions, the second relationship table records the function instructions and associated infrared remote control codes;

a display unit driven by the processing unit to display a user guide, the user guide indicates with illustration hand gestures and associated instructions; and an encode chip;

wherein upon receiving a gesture signal, the processing unit parses the gesture signal into the corresponding function instruction according to the first relationship table, and then outputs the function instruction to the encode chip, the encode chip chooses an infrared remote control code according to the function instruction and the second relationship table and drives the infrared emission unit to emit infrared rays carrying the infrared remote control code to the device.

2. The gesture-based remote control as claimed in claim 1, wherein the gesture sensing unit comprises a camera module and a gesture recognition module, the camera module captures images, the gesture recognition module identifies hand gestures based on the captured images.

3. The gesture-based remote control as claimed in claim 2, wherein the functions instructions also comprise a lock and unlock instructions used to deactivate the camera module for preventing accidental gesture input.

4. The gesture-based remote control as claimed in claim 1, wherein one of the illustration hand gestures and an associated function instruction of the one of the illustration hand gestures are highlighted or caused to blink, as well as the gesture corresponding to the illustration hand gesture parsed and associated function being activated.

5. The gesture-based remote control as claimed in claim 1, wherein the guide interface further comprises an error message illustration for when a gesture cannot be matched up with a function instruction in the first table.

6. A gesture-based remote control for controlling a device, comprising:

a processing unit;

an infrared emission unit;

a gesture sensing unit configured to sense and identify hand gestures and output the gesture signals corresponding to the hand gestures to the processing unit;

a storage unit storing a first relationship table and a second relationship table, the first relationship table records gesture signals and associated function instructions, the second relationship table records the function instructions and associated infrared remote control codes; and an encode chip;

wherein upon receiving a gesture signal, the processing unit parses the gesture signal into the corresponding function instruction according to the first relationship table, and then outputs the function instruction to the encode chip, the encode chip chooses an infrared remote control code according to the function instruction and the second relationship table and drives the infrared emission unit to emit infrared rays carrying the infrared remote control code to the device.

7. The gesture-based remote control as claimed in claim 6, wherein the gesture sensing unit comprises a camera module and a gesture recognition module, the camera module captures images, the gesture recognition module identifies hand gestures based on the captured images.

8. The gesture-based remote control as claimed in claim 6, wherein the functions instructions also comprise a lock and unlock instructions used to deactivate the camera module for preventing accidental gesture input.

* * * * *